G. GONDOS.
ROTARY DRILL.
APPLICATION FILED OCT. 21, 1914.
1,189,560.  Patented July 4, 1916.
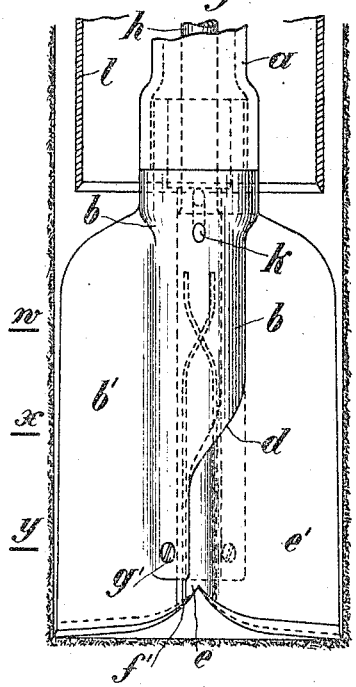
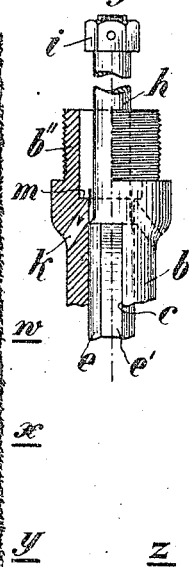
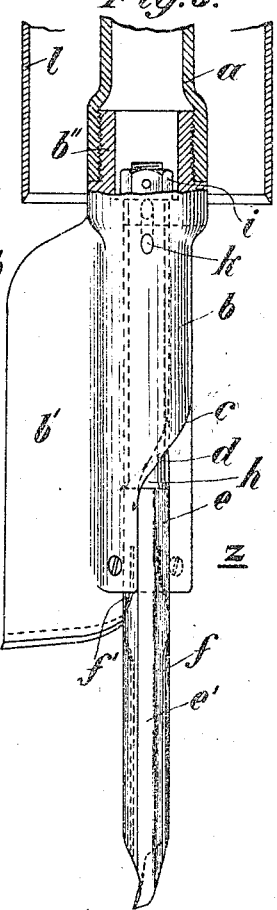
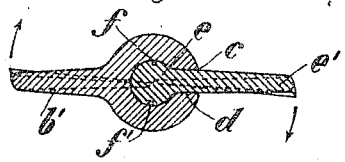
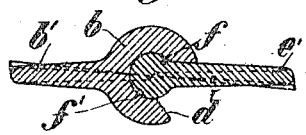
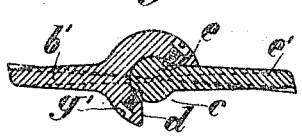
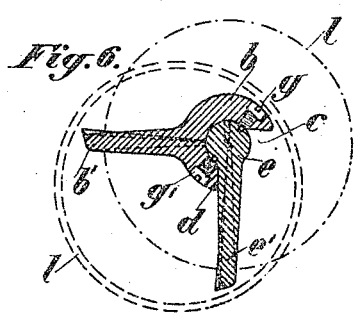

UNITED STATES PATENT OFFICE.

GEORG GONDOS, OF ZURICH, SWITZERLAND.

ROTARY DRILL.

1,189,560.   Specification of Letters Patent.   Patented July 4, 1916.

Application filed October 21, 1914. Serial No. 867,917.

*To all whom it may concern:*

Be it known that I, GEORG GONDOS, a subject of the Emperor of Austria, King of Hungary, residing at Zurich, Switzerland, have invented certain new and useful Improvements in Rotary Drills, of which the following is a full, clear, and exact specification.

The present invention relates to improvements in rotary drills, particularly to that class having two cutting blades.

It is the object of the invention to provide a rotary drill having the cutting blade provided with a cylindrical guideway and a second cutting blade slidably and pivotally engaged in said guideway, both blades being held diametrically opposed while they are in adjacent and operative positions, while the second blade is constrained to move through an angle with respect to the first blade when the former slides downward along said guideway.

The preferred form of my invention is illustrated in the accompanying drawing, in which:

Figure 1 is a front view of the rotary drill in working position. Fig. 2 is a horizontal section on line $w$—$w$ of Fig. 1. Fig. 3 is a similar section on line $x$—$x$ of Fig. 1. Fig. 4 is a similar section on line $y$—$y$ of Fig. 1. Fig. 5 is a front view of the drill partly in section with the cutting blades in their position of rest. Fig. 6 is a horizontal section on line $z$—$z$ of Fig. 5, and Fig. 7 is a front view at a right angle to Fig. 1 of the upper end of the drill partly in section.

The drill comprises a casing 1 in which the drill rod $a$ is provided to which a cutter blade $b'$ is attached having a cylindrical guideway $b$ coaxially arranged to said drill rod. In said cylindrical guideway a second blade $e'$ is slidably and pivotally arranged, while a slot and pin connection $k$ on said guideway is adapted to hold both blades $b'$ and $e'$ diametrically opposed, while they are in their adjacent or operative position. The second blade slides within grooves $f$ $f'$ by means of pins $g$, $g'$ and is thus constrained to move through any angle with respect to said first mentioned blade when sliding downward under its own weight along said guideway $b$.

What I claim is:

A rotary drill comprising a cutting blade adapted to be attached to a drill rod, a cylindrical guideway on said blade coaxial with said drill rod, a second cutting blade having slidable and pivotal engagement in said cylindrical guideway, and slot and pin connections provided on said guideway and arranged to hold said blades diametrically opposed while the same are in adjacent and operative position, and to constrain said second blade to move through an angle with respect to said first mentioned blade while said second blade slides downward along said guideway.

In testimony whereof I affix my signature in presence of two witnesses.

GEORG GONDOS.

Witnesses:
 CARL GUBLER,
 CONRAD BALTHAUSER.